Oct. 15, 1968     T. D. LODE     3,406,291
METHOD OF ESTABLISHING A VOLTAGE STANDARD
USING A PHOTOELECTRIC TUBE
Filed Jan. 13, 1965

INVENTOR
TENNY LODE

United States Patent Office 3,406,291
Patented Oct. 15, 1968

3,406,291
METHOD OF ESTABLISHING A VOLTAGE STANDARD USING A PHOTOELECTRIC TUBE
Tenny D. Lode, Madison, Wis., assignor to Rosemount Engineering Company, Minneapolis, Minn., a corporation of Minnesota
Filed Jan. 13, 1965, Ser. No. 425,178
4 Claims. (Cl. 250—220)

ABSTRACT OF THE DISCLOSURE

A voltage level is established by alternate illumination of a photocathode with different and precisely known frequencies. The energy of resulting photoelectrons is a function of frequency and also work function of the cathode but the difference in potential at the different frequencies is independent of work function and thus serves as a standard voltage. The standard voltage is derived by noting the difference in bias voltage required to cut off anode current.

---

Figure 1:
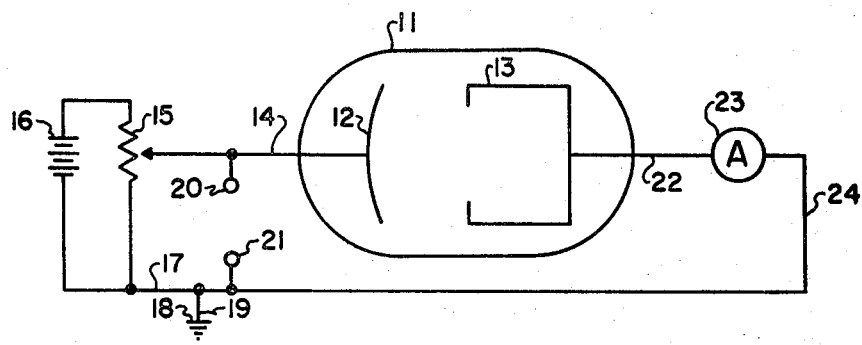

This invention relates to methods and means for the establishment of precise, reproducible standard values of electrical voltage. More particularly, it relates to the establishment of voltage standards which are stable over long periods of time and which are reproducible from one instrument to another with little or no individual calibration.

The wavelengths of certain spectral lines of light have become accepted as absolute standards of length. The meter as a unit of length is now defined as 1,650,763.73 wavelengths of a particular spectral line emitted by isotope 86 of krypton gas. It is highly desirable to define a standard in terms of such a fundamental property of nature. Once such a definition has been made, any laboratory may build or purchase a suitable krypton lamp and then measure length with absolute accuracy. It is no longer necessary to rely entirely on standards which have been calibrated at a central standards laboratory.

Unfortunately, the standards situation for electrical measurements is far less satisfactory. The unit of voltage (the volt) has been defined in terms of the so-called fundamental units of mass, length and time plus an assumed value for the magnetic permeability of free space. In theory, any laboratory could derive a standard voltage from these fundamental definitions. In practice, this process is sufficiently difficult so that it is normally performed only at the National Bureau of Standards in the United States and other national laboratories such as the National Physical Laboratory in England. Even at these laboratories, standard cells are used to provide a day to day voltage reference and absolute calibration is obtained by periodically calibrating these standard cells.

The usual procedure for establishing standards of voltage at outlying laboratories is to ship standard cells to a central standards laboratory for calibration and then back to the outlying laboratory for use as a calibrated reference. This is not a particularly simple procedure as changes in temperature, tipping, or mechanical shock may change the voltage of the standard cell. Precision standard cells are frequently transported by messenger in battery powered constant temperature chambers. The usual practice is to allow a cell to "settle" at a constant temperature for several months after arrival at the calibration laboratory and after arrival back at the outlying laboratory. It generally requires several years and the calibration of many different standard cells at different times by a central standards laboratory to establish confidence in a precise voltage standard maintained at an outlying laboratory.

An object of this invention is to provide a method and means for the establishment of reproducible standard values of electrical voltage. A further object is to provide standards of voltage with convenience, availability, and reproducibility similar to that achieved through the use of spectral lines of light as a length standard.

In a particular form of the present invention, the cathode of a photoelectric vacuum tube is illuminated alternately with monochromatic light of two different wavelengths. The anode voltage corresponding to the maximum energy of emitted photoelectrons is measured for each of the two wavelengths. The difference in the two voltage values is taken as the standard voltage value.

Figure 2:
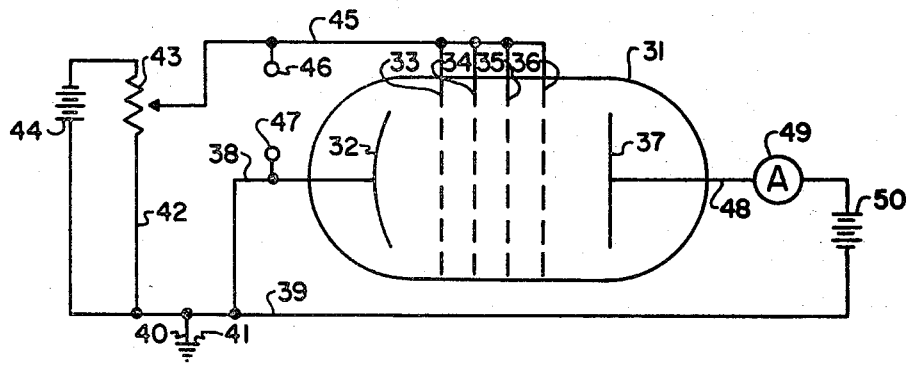

In the drawings:
FIGURE 1 is a schematic illustration of a first form of the invention employing a simple two element photoelectric tube with a cavity shaped anode; and
FIGURE 2 is a schematic illustration of a second form of the invention employing a photoelectric tube with a grid structure between the cathode and anode.

Referring now to the drawings, FIGURE 1 includes photoelectric tube 11 with photocathode 12 and anode 13. Line 14 connects from cathode 12 to the movable arm of potentiometer 15. A first side of potentiometer 15 connects to the positive side of battery 16, the negative side of which connects to ground line 17. Ground line 17 connects to ground 18 via line 19. The second side of potentiometer 15 connects to ground line 17. Terminals 20 and 21 connect to lines 14 and 17 respectively. Line 22 connects from anode 13 to a first side of current meter 23, the second side of which connects via line 24 to ground line 17.

The photoelectric effect was one of the early experimental indications of the quantum nature of light. The maximum energy of an emitted photoelectron is frequently expressed as $$\text{energy} = E = fh - qw$$

where $f$ is the frequency of the incident light, $h$ is Planck's constant, $q$ is the charge of the electron, and $w$ is the work function of the cathode material. It is convenient to measure this energy as a product of a voltage and the charge of the electron. The above equation may then be rewritten as $$V = fh/q - w$$

In an idealized case, the above voltage is the retarding voltage against which emitted photoelectrons will just barely reach the anode. For pure metals, the work function varies from approximately 4.5 volts for tungsten to approximately 2 volts for the alkali metals. The lowest work functions observed have been for cathodes of alloys and compounds including one or more of the alkali metals. The energy of a photoelectron emitted because of incident visible green light is of the order of two or three volts minus the cathode work function.

The structure of FIGURE 1 may be used to determine the maximum energy of photoelectrons emitted in response to monochromatic or single wavelength light. For a simplified view, we might assume that all photoelectrons are emitted normal to the cathode surface and with equal energies. We would then expect essentially all emitted electrons to reach the anode if the cathode were less positive than the voltage corresponding to the emission energy. For positive cathode voltages greater than this value, we would expect the anode current to be zero. The cathode voltage may be varied by adjusting potentiometer 15. The maximum photoelectron energy would be measured by setting the cathode voltage at the value at which the anode current, as measured by current meter 23, fell to zero. This voltage may then be measured across terminals 20 and 21. In practice, photoelectrons will generally be emitted in random directions throughout a hemisphere facing away from the interior of the photocathode. Hence, anode 13 has a cup or cavity shape to increase the efficiency of collection of low energy photoelectrons traveling at a slight skew angle. Photoelectrons will be emitted with less than the maximum energy. This will cause the cut off of the anode current to be less sharp than in the idealized case described above. However, it will still be possible to measure an effective anode cutoff voltage. Thermal errors may be reduced by strongly cooling photoelectric tube 11.

If the work function of the cathode were known, it would be possible to use the maximum photoelectron energy and corresponding anode cutoff voltage for a given wavelength of incident light as a voltage standard. The voltage would depend only upon the wavelength of the incident light and certain fundamental constants of nature. Since light sources of precisely known wavelength are easily constructed, this would provide a standard of voltage which would be stable and reproducible. However, a major problem with such a voltage standard is that the cathode work function may vary with time. In addition, the anode cutoff voltage will also depend in part on the anode work function.

To avoid the problems of uncertainty and/or slow drift in the cathode and anode work functions, the present invention makes use of the difference in the anode cutoff voltages for two different frequencies of monochromatic light as a voltage standard. The magnitude of this voltage will then be given by $$V = (f_1 - f_2)h/q$$

In use, phototube 11 is illuminated first with monochromatic light of a first wave length and a first anode cutoff voltage is measured. Phototube 11 is then illuminated with monochromatic light of a second wavelength and a second anode cutoff voltage is measured. The standard voltage is taken as a difference between the two successive voltage measurements. This difference will be essentially independent of the cathode and anode work functions.

Reference is now made to FIGURE 2 which is a schematic illustration of a second form of the invention employing a photoelectric tube with a grid structure between the cathode and anode. In FIGURE 2, photoelectric tube 31 includes photocathode 32, grids 33, 34, 35 and 36, and anode 37. Cathode 32 connects via line 38 to ground line 39. Ground line 39 connects via line 40 to ground 41. Line 42 connects from ground line 39 to a first side of potentiometer 43, the second side of which connects to the negative side of battery 44. The positive side of battery 44 connects to ground line 39. Grids 33, 34, 35 and 36 are connected in parallel via line 45 to the movable arm of potentiometer 43. Terminals 46 and 47 connect to lines 45 and 38, respectively. Anode 37 connects via line 48 to a first side of current meter 49, the second side of which connects to the positive side of battery 50. The negative side of battery 50 connects to ground line 39.

The structure of FIGURE 2 generally resembles the structure of FIGURE 1, except that the maximum energy of a photoelectron is measured in terms of the magnitude of a potential barrier which is traversed. Photoelectrons traversing the potential barrier are collected by a positively charged anode. In the circuit of FIGURE 2, photoelectrons are emitted from cathode 32 in response to incident light. Grids 33, 34, 35 and 36 are maintained at a negative potential with respect to cathode 32 as determined by the setting of potentiometer 43. Photoelectrons whose energy is less than the cathode grid voltage will not pass through the grid region but will return to the cathode region. Photoelectrons of greater energy will pass through the grid region and be collected by the anode. The use of multiple grids provides a particularly uniform potential region between inner grids 34 and 35. Anode current is measured by current meter 49. In operation, potentiometer 43 is adjusted to determine the voltage at which current to anode 37 is essentially cut off. This voltage may then be measured across terminals 46 and 47. To establish a voltage standard, photocathode 32 is illuminated alternately with monochromatic light of two different wavelengths and the difference in the corresponding anode cutoff voltages taken as the voltage standard. In some instances, it may be desirable to replace anode 37 with an electron multiplier structure which may be used as a more sensitive detector of current passing through the grids of tube 31.

The preceding description has referred to the illumination of a photocathode with light. The term "light" does not necessarily imply visible light but may include ultraviolet and/or infrared energy. The preceding description has also referred to a process of illuminating a photocathode alternately with monochromatic light of two different wavelengths and measuring two different cutoff voltages. In some instances, it may be desirable to illuminate the photocathode simultaneously with light containing two or more monochromatic components each of precisely known wavelength. The various cutoff voltages corresponding to the individual wavelengths may then be measured, for example, by sweeping the measurement voltage through a range of values and noting the corresponding anode current, for example, with an oscilloscope.

What is claimed is:

1. The method of establishing a standard value of electrical voltage comprising illuminating the cathode of a photoelectric vacuum tube with monochromatic light having a precisely known first frequency thereby causing emission of first photoelectrons having an energy level dependent upon the first frequency, measuring a first voltage required to cut off collection of the first photoelectrons at an anode, illuminating the cathode with monochromatic light having a precisely known second frequency thereby causing emission of second photoelectrons having an energy level dependent upon the second frequency, measuring a second voltage required to cut off collection of the second photoelectrons at the anode, and measuring the difference in cut-off voltages for photoemissions due to light of the first frequency and light of the second frequency, whereby the voltage difference is proportional to the difference between the first and second frequencies.

2. The method of claim 1 including cooling the photoelectric vacuum tube to reduce effects of thermal energy upon the cathode.

3. The method of claim 1 wherein the first and second voltages are measured by adjusting an external bias supply connected between anode and cathode to a level where current flow is substantially zero between anode and cathode.

4. The method of claim 1 wherein the first and second voltages are measured by adjusting an external bias supply connected between the cathode and a grid structure between the cathode and anode to a level where current flow is substantially zero between anode and cathode.

References Cited

UNITED STATES PATENTS

| 2,438,586 | 3/1946 | Sziklai | 250—207 |
| 2,503,165 | 4/1950 | Meyer | 250—207 |
| 2,583,143 | 1/1952 | Glick | 250—207 |
| 2,850,645 | 9/1958 | Chilton et al. | 250—207 X |
| 3,195,398 | 7/1965 | Shaw | 250—207 X |

WALTER STOLWEIN, *Primary Examiner.*